Feb. 4, 1936.  W. B. KOCHNER  2,029,575
TOASTER BASE ASSEMBLY
Filed May 27, 1935
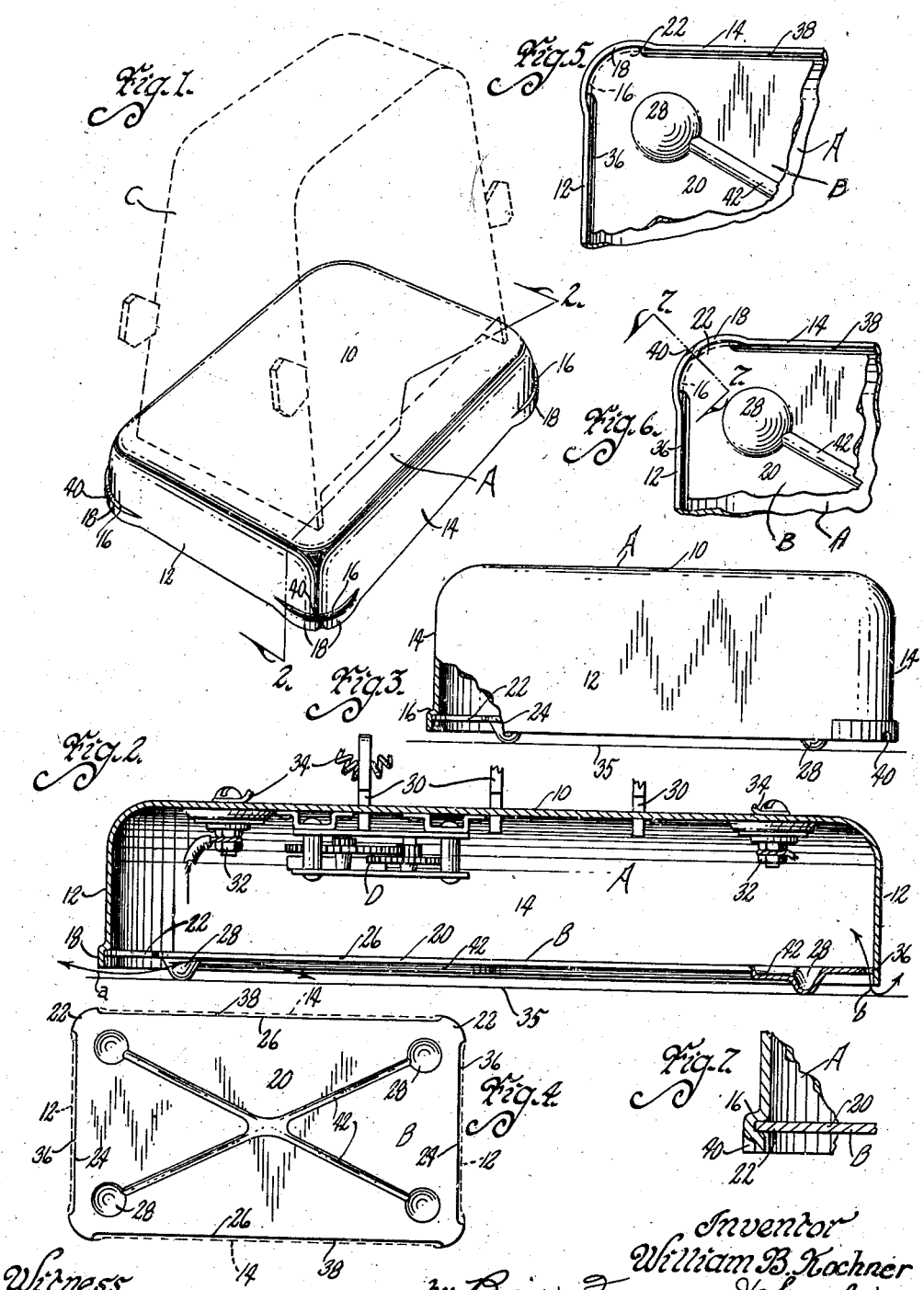
Inventor
William B. Kochner
By Bair, Freeman & Sinclair
Attorneys
Witness
Edw. Seeley Patented Feb. 4, 1936

2,029,575

UNITED STATES PATENT OFFICE 2,029,575

TOASTER BASE ASSEMBLY

William B. Kochner, St. Louis, Mo., assignor to Knapp-Monarch Company, St. Louis, Mo., a corporation of Missouri Application May 27, 1935, Serial No. 23,686

18 Claims. (Cl. 53—5)

An object of my invention is to provide a base assembly for toasters or other electrical appliances which is simple in construction and which can be assembled in a minimum period of time without the use of screws or other fastening means, the device however being substantially durable and inexpensive.

A further object is to provide a base assembly for toasters and the like comprising an inverted dished base and a bottom plate, these two parts being so associated as to permit air circulation under the base and between the top of the base and the bottom plate to carry heat away from parts of the toaster or other appliance mounted on the base.

Still a further object is to assemble the bottom plate relative to the dished base in a permanent manner without the use of screws or other fastening means and by comparatively simple assembling operations.

Another object is to provide a base having off-set portions adjacent the corners of the lower edge for a bottom plate to engage, the bottom plate being provided with feet to support itself and the engagement of the bottom plate with the off-set portions in turn supporting the base, these feet being of such height as to permit air circulation under the edge of the base and the bottom plate having portions of its edge spaced inwardly from the base to provide an air space so that air can circulate under the top of the base and above the bottom plate as well as below the bottom plate, yet the appliance when supported on a table top surface or the like is neat in appearance without providing the usual supporting legs at the corners which project below the lower edge of the periphery of the base in the ordinary toaster.

With these and other objects in view my invention consists in the construction, arrangement and combination of the various parts of my device, whereby the objects contemplated are attained, as hereinafter more fully set forth, pointed out in my claims and illustrated in the accompanying drawing, in which:

Figure 1 is a perspective view of a toaster base assembly embodying my invention, a toaster casing being illustrated in dotted lines thereon.

Figure 2 is a sectional view on the line 2—2 of Figure 1 showing parts of a toaster apparatus associated with the base.

Figure 3 is an end elevation of the assembly, one corner thereof being broken away and parts shown in section.

Figure 4 is a bottom plan view of a bottom plate which is part of the assembly.

Figure 5 is an enlarged bottom plan view of one corner of the assembly before assembling is completed.

Figure 6 is a similar view showing the assembly completed; and

Figure 7 is an enlarged sectional view on the line 7—7 of Figure 6.

On the accompanying drawing, I have used the reference character A to indicate generally a base member and B a bottom plate therefor. The base and its bottom plate are adapted to support any kind of an electric appliance, such for example as a toaster casing C, illustrated by dotted lines in Figure 1. The base member A comprises a flat top 10 having down-turned end flanges 12 and side flanges 14. At the corners the flanges 12 and 14 have off-set portions, indicated at 16, which I call shoulders. Below the shoulders 16 the flanges 12 and 14 extend downwardly as indicated at 18.

The bottom plate B is a flat sheet of metal or the like indicated as 20 and characterized by corner projections 22 shaped to fit inside the flange portions 18 and against the shoulders 16. Between the corner projections 22, the edges of the sheet 20 are cut back along end and side lines 24 and 26.

The sheet 20 is provided with downwardly directed depressions 28 to serve as feet for supporting the base assembly. The depth of these depressions is greater than the height of the flange portions 18 for a purpose which will hereinafter appear.

In Figure 2 I have illustrated toaster apparatus mounted on the base A and the base can be suitably perforated for such apparatus or for any other apparatus or other types of electric appliances. By way of illustration, I have shown insulators 30 projecting through the base plate 10, terminal bolts 32 supported on the base plate and a timing mechanism D adapted for timing the toasting operation. At 34 a portion of the heating element of the toaster is illustrated.

Many of the parts projecting downwardly from the base plate 10 are of metal and conduct heat, which would ordinarily be radiated downwardly to the detriment of a supporting surface 35 such as a table top or the like.

By providing the depressions 28, the bottom plate B is supported above the surface 35 so that air can circulate under the bottom plate as indicated by the arrow $a$ in Figure 2. The depressions 28 which form supporting feet, it will be noted, support the lower edge of the base member A above the surface 35 to permit such circulation.

The edges 24 and 26 of the bottom plate B are spaced inwardly from the flanges 12 and 14 to provide spaces indicated at 36 and 38 respectively in Figures 2, 4, 5 and 6. Figure 4 shows the inner surfaces of the flanges 12 and 14 as a dotted line in order to clearly illustrate the spaces 36 and 38. The spaces 36 and 38 permit air circulation as indicated by the arrow b in Figure 2.

The plate B is held assembled relative to the base member A in a unique manner without screws or other fastening means. This consists of depressions 40 pressed into the center part of each flange portion 18 after the part B is inserted into position against the shoulder 16. In Figure 5 I illustrate the plate B inserted in the base member against the shoulder 16 and in Figure 6 I show the next step in the assembly process, consisting of bending the depression 40 inwardly so that the plate B is then permanently assembled relative to the base member.

The plate B may be formed of comparatively thin metal and reinforced against bending and springing out of position relative to the base member A by ribs 42 formed therein crossing each other and terminating at the depressions 28 as shown in Figure 4.

The particular construction I have disclosed provides for an effective circulation of air both over the plate B and between it and the base plate 10 to dissipate heat from the parts of the toaster or other electric apparatus projecting into the base and to also dissipate heat conducted through the base to the space therewithin.

Even though accomplishing these desirable results the assembly is simple and readily assembled without having to use any parts in addition to the two parts A and B.

Some changes may be made in the construction and arrangement of the parts of my device without departing from the real spirit and purpose of my invention and it is my intention to cover by my claims any modified forms of structure or use of mechanical equivalents, which may be reasonably included within their scope.

I claim as my invention:

1. In a base assembly of the character described, an inverted dished base, a plurality of spaced shoulders formed therein adjacent the lower edge thereof, a bottom plate having spaced portions on its periphery engaging said shoulders for supporting said base and feet on said bottom plate to support it relative to a table top surface or the like and to space it therefrom, said feet being higher than the distance between the bottom of said bottom plate and the lower edge of said base to space said lower edge from such surface, the portions of the periphery of said bottom plate intermediate said first-mentioned portions being spaced from said base to permit air circulation between said periphery and said base.

2. In a base for electrical appliances and the like, an inverted dished base, a plurality of spaced shoulders adjacent the lower edge thereof, a bottom plate engaging said shoulders for supporting said base, the edges of said bottom plate between said shoulders being spaced from the wall of said base and feet on said bottom plate to support it relative to a table top surface or the like and to space it therefrom.

3. A base for electrical appliances and the like, a plurality of peripherally spaced shoulders adjacent the lower edge thereof, a bottom plate engaging said shoulders for supporting said base, the edges of said bottom plate between said shoulders being spaced from the wall of said base and feet on said bottom plate to support it relative to a table top surface or the like and to space it therefrom, said feet being higher than the distance between the bottom of said bottom plate and the lower edge of said base to space said lower edge from said surface.

4. In a base for electric appliances and the like, an inverted dished base, heat generating apparatus thereon having a portion projecting into said base, a plurality of shoulders formed therein adjacent the lower edge thereof, a bottom plate engaging said shoulders for supporting said base and feet on said bottom plate to support it relative to a table top surface or the like and to space it therefrom, said feet being higher than the distance between the bottom of said bottom plate and the lower edge of said base to space said lower edge from such surface, a portion of the edge of said bottom plate being spaced from said base to permit air circulation between said edge and said base to permit the entrance of air to the space within said base and above said bottom plate to carry heat away from said heat generating apparatus portion projecting into said base.

5. In a base for electric appliances and the like, an inverted dished base, heat generating apparatus thereon having a portion projecting into said base, a plurality of spaced shoulders adjacent the lower edge thereof, a bottom plate engaging said shoulders for suporting said base, the edges of said bottom plate between said shoulders being spaced from the wall of said base and feet on said bottom plate to support it relative to a table top surface or the like and to space it therefrom, said feet being higher than the distance between the bottom of said bottom plate and the lower edge of said base to space said lower edge from such surface to permit air entrance for the purpose of cooling said heat generating apparatus projecting into said base.

6. In a base assembly, an inverted dished base, a plurality of spaced shoulders adjacent the lower edge thereof, a bottom plate engaging said shoulders for supporting said base, inward projections from said base below said bottom plate to retain it against said shoulders, downwardly directed depressions in said bottom plate to support it relative to a table top surface or the like and to space it therefrom, said depressions being deeper than the distance between the bottom of said bottom plate and the lower edge of said base to space said lower edge from such surface, the portions of the edge of said bottom plate between said shoulders being spaced from said base to permit air circulation between said bottom plate and said base.

7. A base for electrical appliances and the like, a plurality of peripherally spaced shoulders adjacent the lower edge thereof, a bottom plate concealed within said base and engaging said shoulders for supporting said base and depressions on said bottom plate to support it relative to a table top surface or the like and to space it and the lower edge of said base therefrom.

8. In a base for electric appliances and the like, an inverted dished base, heat generating apparatus thereon having a portion projecting into said base, a plurality of shoulders formed therein adjacent the lower edge thereof, a bottom plate engaging said shoulders for supporting said base and depressions on said bottom plate to support it relative to a table top surface of the like and to space it therefrom, said depressions being deeper than the distance between the bottom of said bottom plate and the lower edge of said base to space said lower edge from such surface, a portion of the edge of said bottom plate being spaced from said base to permit air circulation between said edge and said base to permit the entrance of air to the space within said base and above said bottom plate to carry heat away from said heat generating apparatus portion projecting into said base.

9. In a base for electric appliances and the like, an inverted dished base element, heat generating apparatus thereon, having a portion projecting into said base, a bottom plate having a plurality of portions of its edge secured to said base adjacent the lower edge thereof, the portions of said edge of said bottom plate between the secured portions thereof being spaced from the wall of said base to permit such air circulation therebetween, and means for supporting said base with its lower edge spaced above a supporting surface to also permit air circulation to cool said heat generating apparatus portion.

10. In a base for electric appliances and the like, an inverted dished base element, heat generating apparatus thereon, having a portion projecting into said base, a bottom plate having a plurality of portions of its edge secured to said base adjacent the lower edge thereof, the portions of said edge of said bottom plate between the secured portions thereof being spaced from said base to permit air circulation therebetween and downwardly directed projections on said bottom plate whose height exceeds the distance between the bottom surface of said bottom plate and the lower edge of said base to act as feet for said assembly when supported on a table top surface of the like and to thereby space the bottom plate and the lower edge of said base above said surface to permit air circulation for the purpose of cooling said heat generating apparatus portion.

11. In a base assembly of the character described, a base plate having a peripheral down-turned flange, spaced outstruck offset portions adjacent the bottom edge of said flange, a bottom plate within said flange below and engaging said offset portions, instruck portions in said flange below said bottom plate to retain it assembled relative to said base plate, downwardly directed projections on said bottom plate to space it above a supporting surface and the lower edge of said flange likewise above such surface, the edges of said bottom plate between said offset portions being spaced from the inner surface of said flange to permit air circulation between said edges and said flange.

12. In a base assembly, a base plate having a peripheral down-turned flange, spaced outstruck offset portions in said flange, a bottom plate within said flange below and engaging said offset portions, instruck portions in said flange below said bottom plate to retain it assembled relative to said base plate and downwardly directed projections on said bottom plate to space it above a supporting surface and the lower edge of said flange likewise above such surface.

13. In a base assembly, a base plate having a peripheral down-turned flange, spaced outstruck offset portions in said flange, a bottom plate within said flange below and engaging said offset portions, instruck portions in said flange below said bottom plate to retain it assembled relative to said base plate and a plurality of downwardly directed projections in said bottom plate to space it above a supporting surface.

14. In a base assembly, a base plate having a peripheral down-turned flange, spaced outstruck offset portions adjacent the bottom edge of said flange, a bottom plate within said flange below and engaging said offset portions, instruck portions in said flange below said bottom plate to retain it assembled relative to said base plate, a plurality of downwardly directed projections in said bottom plate to space it above a supporting surface, the edges of said bottom plate between said outstruck offset portions being spaced from the inner surface of said flange to permit air circulation between said edges and said flange.

15. In a base assembly, a base plate having a peripheral down-turned flange, spaced outstruck offset portions adjacent the bottom edge of said flange, a bottom plate within said flange below and engaging said offset portions, instruck portions in said flange below said bottom plate to retain it assembled relative to said base plate and a plurality of downwardly directed portions in said bottom plate to space it above a supporting surface and the lower edge of said flange likewise above such surface.

16. In a base assembly, a base plate having a peripheral down-turned flange, spaced outstruck offset portions adjacent the bottom edge of said flange, a bottom plate within said flange below and engaging said offset portions, instruck portions in said flange below said bottom plate to retain it assembled relative to said base plate and downwardly directed projections on said bottom plate to space it above a supporting surface.

17. In a base assembly for electric appliances and the like, a base plate having a peripheral down-turned flange, spaced outstruck offset portions in said flange, a bottom plate within said flange below and engaging said offset portions, instruck portions in said flange below said bottom plate to retain it assembled relative to said base plate, downwardly directed projections on said bottom plate to space it above a supporting surface, electric appliance parts mounted on said base plate and having a portion projecting within said base plate and its peripheral flange, the edges of said bottom plate between said outstruck offset portions being spaced from the inner surface of said flange to permit air circulation between said edges and said flange and over said portion of said electric appliance parts.

18. In a base of the character described, an inverted dished base member, heat generating apparatus thereon having a portion projecting into said base, a plurality of shoulders adjacent the lower edge of said base, a bottom plate engaging said shoulders for supporting said base, projections on said bottom plate to support it relative to a table top surface or the like, and to space it therefrom to permit air entrance for the purpose of cooling said heat generating apparatus portion projecting into said base, said projections being higher than the distance between the bottom of said bottom plate and the lower edge of said base to space said lower edge from such surface, a portion of the edge of said bottom plate being spaced from said base to permit air circulation between said edge and said base and to permit the entrance of air to the space within said base and above said bottom plate to carry heat away from said heat generating apparatus portion projecting into said base.

WILLIAM B. KOCHNER.